USOO8539159B2

(12) United States Patent
Chauvel et al.

(10) Patent No.: US 8,539,159 B2
(45) Date of Patent: Sep. 17, 2013

(54) DIRTY CACHE LINE WRITE BACK POLICY BASED ON STACK SIZE TREND INFORMATION

(75) Inventors: Gerard Chauvel, Antibes (FR); Serge Lasserre, Plascassier (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1894 days.

(21) Appl. No.: 10/631,185

(22) Filed: Jul. 31, 2003

(65) Prior Publication Data
US 2004/0024792 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................................... 03291914

(51) Int. Cl.
*G06F 12/00* (2006.01)
(52) U.S. Cl.
USPC ........... 711/132; 711/117; 711/118; 711/133; 711/143; 711/154; 711/159
(58) Field of Classification Search
USPC ................. 711/117, 118, 132, 133, 143, 154, 711/159; 712/202
See application file for complete search history.

(56) References Cited

U.S. PATENT DOCUMENTS

| | | | | |
|---|---|---|---|---|
| 4,928,239 A | * | 5/1990 | Baum et al. | 711/136 |
| 5,687,336 A | * | 11/1997 | Shen et al. | 712/202 |
| 5,893,121 A | * | 4/1999 | Ebrahim et al. | 707/206 |
| 5,893,148 A | * | 4/1999 | Genduso et al. | 711/132 |
| 6,026,485 A | * | 2/2000 | O'Connor et al. | 712/226 |
| 6,098,089 A | | 8/2000 | O'Connor et al. | 709/104 |
| 6,151,661 A | * | 11/2000 | Adams et al. | 711/132 |
| 6,209,061 B1 | * | 3/2001 | Nelson et al. | 711/132 |

(Continued)

OTHER PUBLICATIONS

T. R. Haining, J.-F. Pâris and D. D. E. Long, "A Stack Model Based Replacement Policy for a Non-Volatile Write Cache", Proceedings of the 8th NASA Goddard Conference on Mass Storage Systems and Technologies, Mar. 27-30, 2000, pp. 205-211.*

(Continued)

*Primary Examiner* — Arpan P. Savla
(74) *Attorney, Agent, or Firm* — Ronald O. Neerings; W. James Brady; Frederick J. Telecky, Jr.

(57) ABSTRACT

Methods and apparatuses are disclosed for managing memory write back. In some embodiments, the method may include examining current and future instructions operating on a stack that exists in memory, determining stack trend information from the instructions, and utilizing the trend information to reduce data traffic between various levels of the memory. As stacked data are written to a cache line in a first level of memory, if future instructions indicate that additional cache lines are required for subsequent write operations within the stack, then the cache line may be written back to a second level of memory. If however, the future instructions indicate that no additional cache lines are required for subsequent write operations within the stack, then the first level of memory may avoid writing back the cache line and also may keep it marked as dirty.

4 Claims, 4 Drawing Sheets

(56) References Cited

U.S. PATENT DOCUMENTS

| | | | | |
|---|---|---|---|---|
| 6,567,905 | B2 | 5/2003 | Otis | 711/170 |
| 6,571,260 | B1 | 5/2003 | Morris | 707/206 |
| 6,671,196 | B2 * | 12/2003 | Civlin | 365/49 |
| 6,801,986 | B2 * | 10/2004 | Steely et al. | 711/152 |
| 6,990,567 | B1 * | 1/2006 | Cohen et al. | 712/202 |
| 7,065,613 | B1 * | 6/2006 | Flake et al. | 711/132 |
| 2002/0065990 | A1 | 5/2002 | Chauvel et al. | 711/137 |
| 2002/0069332 | A1 | 6/2002 | Chauvel et al. | 711/144 |
| 2003/0101320 | A1 | 5/2003 | Chauvel et al. | 711/154 |
| 2003/0221035 | A1 * | 11/2003 | Adams | 710/301 |

OTHER PUBLICATIONS

Kozierok, Charles M., "The Memory Controller", Apr. 17, 2001, The PC Guide, Site Version 2.2.0, <http://www.pcguide.com/ref/ram/timingController-c.html> accessed on Mar. 16, 2008.*

J. Dundas, et al.: "Improving Data Cache Performance by Pre-Executing Instructions Under a Cache Miss", Proceedings of the 1997 International Conference on Supercomputing, Vienna, Jul. 7-11, 1997, Proceedings of the International Conference on Supercomputing, New York, ACM, US, vol. Conf. 11, Jul. 7, 1997, XP000755242, ISBN: 0-89791-902-5, pp. 68-75.

S.S. Pinter, et al.: "Tango: A Hardware-Based Data Prefetching Technique for Superscalar Processors" Proceedings of the 29th. Annual IEEE/ACM International Symposium on Microarchitecture, Micro-29. Paris, Dec. 25, 1996, Proceedings of the Annual IEEE/ACM International Symposium on Microarchitecture, Los Alamitos, IEEE Comp. Soc. Press, U, vol. Symp. 29, Feb. 12, 1996, ISBN: 0-8186-7641-8, XP000724373, pp. 214-225.

*Embedded JAVA*, Vincent Perrier, Aug. 15, 2001, (3 page); Online http://www.onjava.com/pub/a/onjava/synd/2001/08/15/embedded.html.

* cited by examiner

DIRTY CACHE LINE WRITE BACK POLICY BASED ON STACK SIZE TREND INFORMATION

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291914.4, filed Jul. 30, 2003 and entitled "Write Back Policy For Memory," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context", Ser. No. 10/632,076, filed Jul. 31, 2003; "A Processor With A Split Stack," Ser. No. 10/632,079, filed Jul. 31, 2003; "Using IMPDEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Test With Immediate And Skip Processor Instruction," Ser. No. 10/632,084, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003); "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Conditional Garbage Based On Monitoring To Improve Real Time Performance," Ser. No. 10/631,195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003; "Concurrent Task Execution In A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to processor based systems and more particularly to memory management techniques for the processor based system.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

Methods and apparatuses are disclosed for managing memory write back. In some embodiments, the method may include examining current and future instructions operating on a stack that exists in memory, determining stack trend information from the instructions, and utilizing the trend information to reduce data traffic between various levels of the memory. As stacked data are written to a cache line in a first level of memory, if future instructions indicate that additional cache lines are required for subsequent write operations within the stack, then the cache line may be written back to a second level of memory. If however, the future instructions manipulate the stack in such a way that no additional cache lines are required for subsequent write operations within the stack, then the first level of memory may avoid writing back the cache line and also may keep it marked as dirty. In this manner, write back from the first level of memory to the second level of memory may be minimized and overall power consumption may be reduced. Consequently, cache lines containing stack data are preferably written back from first level of memory to a second level of memory once all the words in a cache line have been written to, unless specified otherwise by a stack trend information.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections. The term "allocate" is intended to mean loading data, such that memories may allocate data from other sources such as other memories or storage media.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a processor based system comprising multiple levels of memory. The processor based system described herein may be used in a wide variety of electronic systems. One example comprises using the processor based system in a portable, battery-operated cell phone. As the processor executes various system operations, data may be transferred between the processor and the multiple levels of memory, and consequently, memory space within a given level of memory may fill up. In order to provide adequate system operation, data entries in one memory level may need to be written to another level of memory. Furthermore, multiple processor systems also may necessitate transferring data between levels of memory to maintain a coherent data for all processors. In the following discussion, a first level of memory and a second level of memory shared between several processors will be taken as an example. The processor based system may implement a different cache policy based on stack trends and stack data information in order to reduce the number of transfers among the multiple levels of memory. Consequently, the amount of time taken to transfer data between the multiple levels of memory may be reduced and the overall power consumed by the processor based system may be reduced. In particular, in the embodiment illustrated in FIG. 1, a write back policy is implemented in cache controller 26 of system 10, where traditional write back policies are used for most data. In the event that data belongs to specific data structures (i.e., stack data) the cache write back policy is modified in order to maintain within the cache only a single dirty line at a given time as described below.

Figure 1:
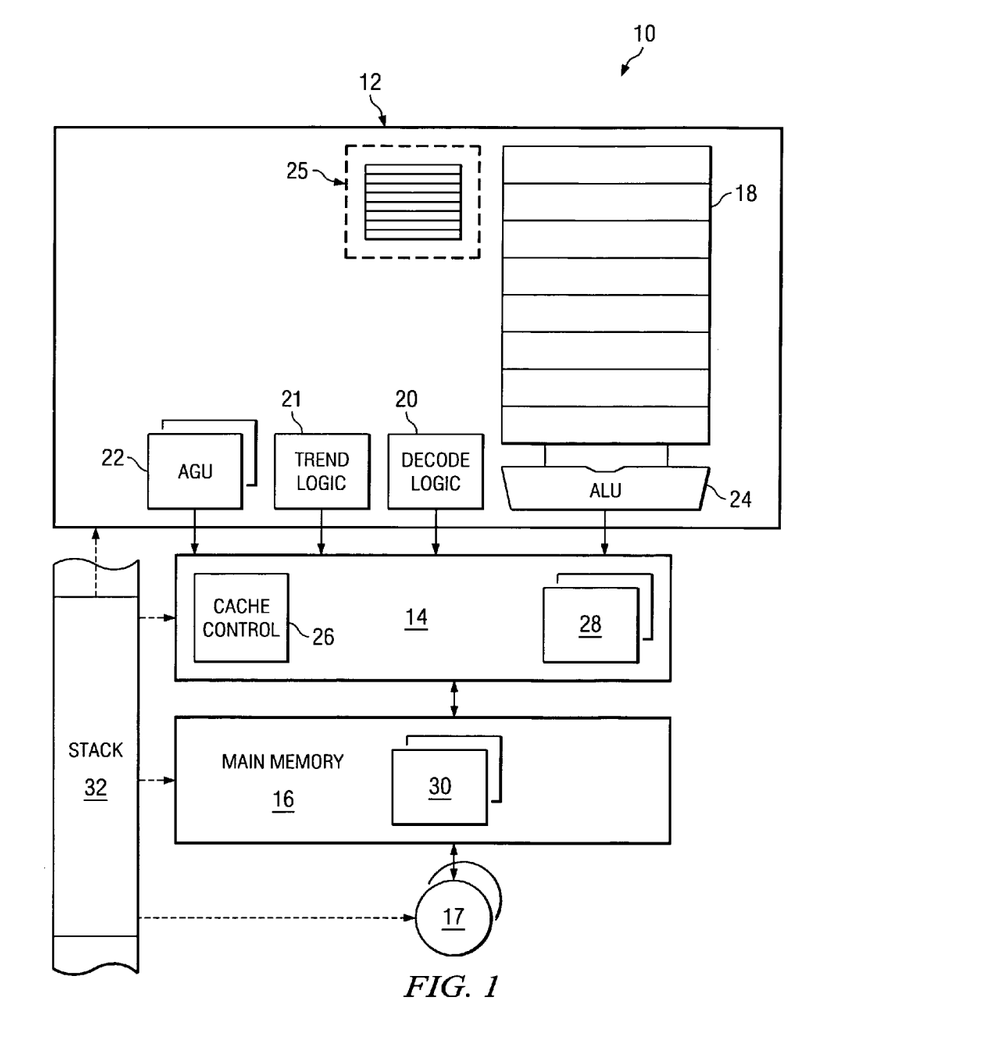
FIG. 1 illustrates a processor based system according to the preferred embodiments.

FIG. 1 illustrates a system 10 comprising a processor 12 coupled to a first level or cache memory 14, a second level or main memory 16, and a disk array 17. The processor 12 comprises a register set 18, decode logic 20, trend logic 21, an address generation unit (AGU) 22, an arithmetic logic unit (ALU) 24, and an optional micro-stack 25. Processor 12 may include a stack based processor, whose instructions operate on a stack. In this manner, Processor 12 may include a "Java Stack Machine" (JSM) as described in the co-pending applications referenced herein. Cache memory 14 comprises a cache controller 26 and a storage space 28.

Main memory 16 comprises a storage space 30, which may contain contiguous amounts of stored data. For example, if the processor 12 is a stack-based processor, (e.g., JSM) main memory 16 may include a stack 32. Additionally, the stack 32 may also reside in cache memory 14, disk array 17, and/or micro-stack 25. Stack 32 preferably contains data from the processor 12 in a last-in-first-out manner (LIFO). If system 10 comprises a multiple processor system, the stack 32 may need to maintain coherency in a level of memory that is shared between the processors, such as in main memory 16, as described below. Register set 18 may include multiple registers such as general purpose registers, a program counter, and a stack pointer. The stack pointer preferably indicates the top of the stack 32. Data may be added to the stack 32 by "pushing" data at the address indicated by the stack pointer. Likewise, data may be retrieved from the stack 32 by "popping" data from the address indicated by the stack pointer. Also, as will be described below, selected data from cache memory 14 and main memory 16 may exist in the micro-stack 25. The number of accesses between memory levels and the cost associated with each memory level illustrated in FIG. 1 may be adapted to achieve optimal system performance. For example, the cache memory 14 may be part of the same integrated circuit as the processor 12 and main memory 16 may be external to the processor 12. In this manner, the cache memory 14 may have relatively quick access time compared to main memory 16, however, the cost (on a per-bit basis) of cache memory 14 may be greater than the cost of main memory 16.

As the software executes on system 10, processor 12 may issue effective addresses along with read or write data requests, and these requests may be satisfied by various system components (e.g., cache memory 14, main memory 16, micro-stack 25, or disk array 17) according to a memory mapping function. Although various system components may satisfy read/write requests, the software may be unaware whether the request is satisfied via cache memory 14, main memory 16, micro-stack 25, or disk array 17. Preferably, traffic to and from the processor 12 is in the form of words, where the size of the word may vary depending on the architecture of the system 10. Rather than containing a single word from main memory 16, each entry in cache memory 14 preferably contains multiple words referred to as a "cache line". In this manner, the principle of locality—i.e., within a given period of time, programs tend to reference a relatively confined area of memory repeatedly—may be utilized. Therefore, the efficiency of the multi-level memory may be improved by infrequently writing cache lines from the slower memory (main memory 16) to the quicker memory (cache memory 14), and accessing the cache lines in cache memory 14 as much as possible before replacing a cache line.

Figure 2:
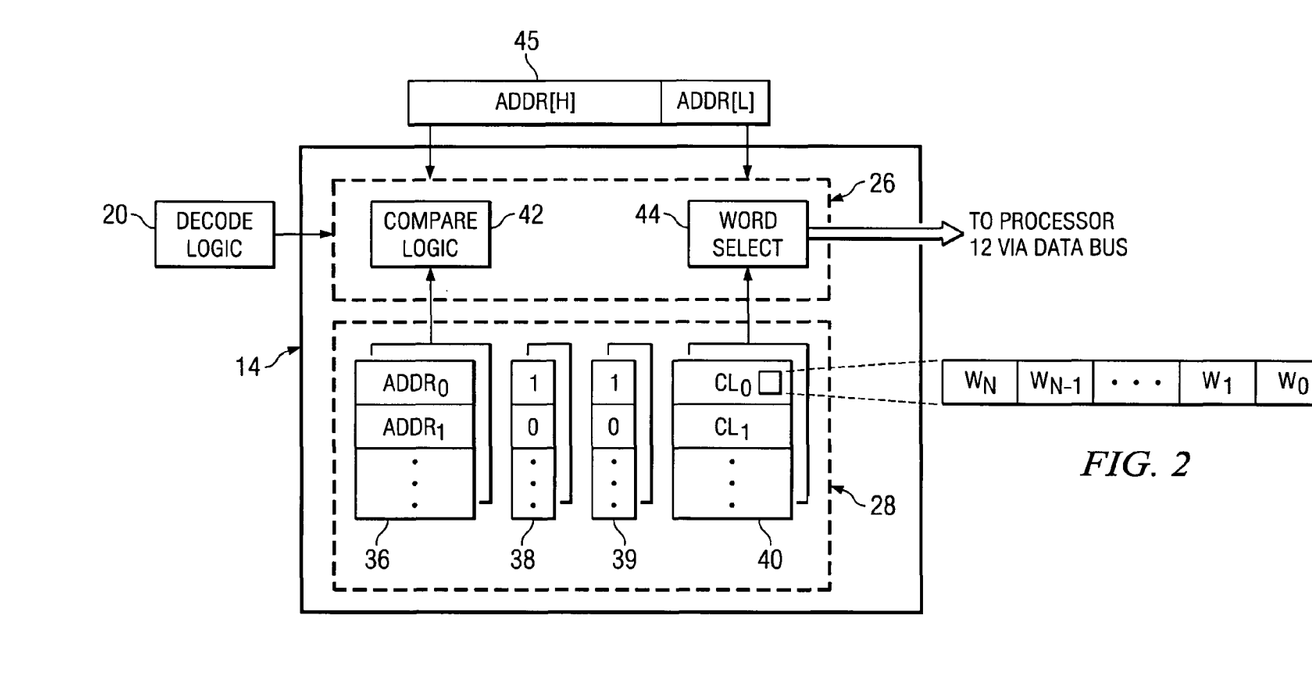
FIG. 2 illustrates an exemplary controller.

Controller 26 may implement various memory management policies. FIG. 2 illustrates an exemplary implementation of cache memory 14 including the controller 26 and the storage space 28. Although some of the Figures may illustrate controller 26 as part of cache memory 14, the location of controller 26, as well as its functional blocks, may be located anywhere within the system 10. Storage space 28 includes a tag memory 36, valid bits 38, dirty bits 39, and multiple data arrays 40. Data arrays 40 contain cache lines, such as $CL_0$ and $CL_1$, where each cache line includes multiple data words as shown. Tag memory 36 preferably contains the addresses (or a most significant part of the addresses, depending on the cache associativity) of data stored in the data arrays 40, e.g., $ADDR_0$ and $ADDR_1$ correspond to cache lines $CL_0$ and $CL_1$ respectively. Valid bits 38 indicate whether the data stored in the data arrays 40 are valid. For example, cache line $CL_0$ may be enabled and valid, whereas cache line $CL_1$ may be disabled and invalid. Dirty bits 39 indicate whether a cache line has been modified. The operation of the dirty bits 39 will be described below with respect to "write back" policies.

Controller 26 includes compare logic 42 and word select logic 44. The controller 26 may receive an address request 45 from the AGU 22 via an address bus, and data may be transferred between the controller 26 and the ALU 24 via a data bus. The size of address request 45 may vary depending on the architecture of the system 10. Address request 45 may include an upper portion ADDR[H] that indicates which cache line the desired data is located in, and a lower portion ADDR[L] that indicates the desired word within the cache line. Although FIG. 2 depicts a fully associative cache 14, this configuration is portrayed solely for the sake of clarity. It should be noted that the subject matter disclosed herein equally applies to any order of multi-way set associative cache structures where the address 45 is split into three parts—an upper portion ADDR[H], a middle portion ADDR [M], and a lower portion ADDR[L]. Compare logic 42 may compare the requested data address to the contents of the tag memory 36. If the requested data address is located in the tag memory 36 and the valid bit 38 associated with the requested data address is enabled, then the cache line may be provided to the word select logic 44. Word select logic 44 may determine the desired word from within the cache line based on the lower portion of the data address ADDR[L], and the requested data word may be provided to the processor 12 via the data bus. Dirty bits 39 may be used in conjunction with the write back policy. On a write request, if the data is modified within the cache without being modified in main memory, the corresponding dirty bit associated with the cache line where the data resides is set to indicate that the data is not coherent with its value in main memory. Subsequently, dirty cache lines may be evicted from cache space as space is needed. Dirty lines that are evicted during a line replacement caused by a cache miss need to be written back to the main memory, whereas non-dirty lines may be simply overwritten. Consequently, in cache memory structures having write back policies, data are made coherent within the main memory when they are evicted from the cache either when selected as victim line by the replacement policy (e.g. LRU, random), or when an explicit request like a "clean cache" command occurs. The write back policy may be adapted for certain data types in order to improve overall system performance. Decode logic 20 processes the address of the data request and may provide the controller 26 with additional information about the address request. For example, the decode logic 20 may indicate that the requested data address belongs to the stack 32 (illustrated in FIG. 1). Using this information, the controller 26 may implement cache management policies that are optimized for stack based operations as described below.

As a result of the processor 12 pushing and popping data to and from the top of the stack 32, the stack 32 expands and contracts. Data are pushed on the stack 32 and popped off of the top of the stack 32 in a sequential manner—i.e., stack data is preferably accessed using sequential addressing as opposed to random addressing. Also, for the sake of the following discussion, it will be assumed that when the system 10 is addressing stack data, the corresponding address in memory increases as the stack 32 is growing (e.g. system 10 is pushing a value on to the stack 32). Thus, as stack data is written to new cache lines in cache memory 14, the stack data is written to the first word of this cache line and subsequent stack data are written to the subsequent words of the cache line. For example, in pushing stack data to cache line $CL_0$ (illustrated in FIG. 2), word $W_0$ would be written to before word $W_1$. Since data pushed from the processor 12 represents the most recent version of the data in the system 10, consulting main memory 16 on a cache miss is unnecessary.

Figure 3:
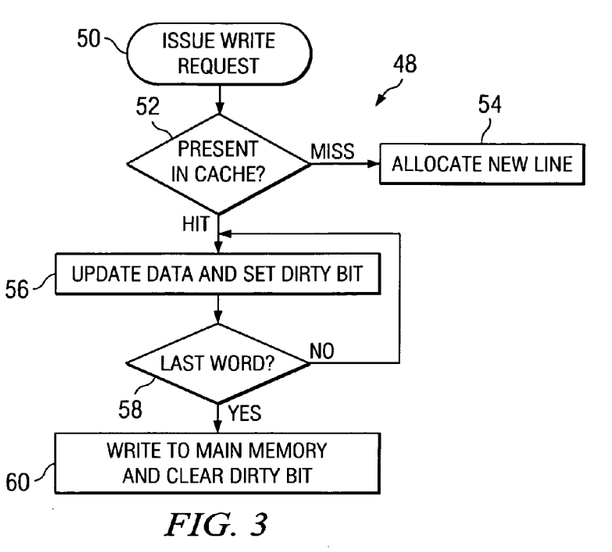
FIG. 3 illustrates an exemplary memory management policy.

In accordance with some embodiments, data may be written to cache memory 14 on a cache miss without allocating or fetching cache lines from main memory 16, as indicated in co-pending application entitled "Methods And Apparatuses For Managing Memory," filed Jul. 31, 2003, Ser. No. 10/631, 185. FIG. 3 illustrates a system optimization in the cache management 48 related to a write back policy for stack data that may be implemented by the controller 26. Block 50 illustrates a write request for stack data. As a result of the stack data write request, the AGU 22 may provide the address request 45 to the controller 26. Controller 26 then may determine whether the data is present in cache memory 14, as indicated by block 52. If the data is not present within cache memory 14, a "cache miss" may be generated, and cache memory 14 may allocate a new line per block 54. If the data is present within the cache, a "cache hit" may be generated, the data may be updated, and the dirty bit of the corresponding line may be set as indicated in block 56. During the cache update, the cache controller determines if the address corresponds to the last word of a cache line per block 58. If the address does not correspond to the last word in the cache line, the cache is updated per block 56. Otherwise, if the address corresponds to the last word, the cache controller 26 writes back the line to the main memory as indicated in block 60. When the line is written back to main memory, the dirty bit is cleared indicating that cache and main memory hold coherent data. This creates potentially additional data transfer compared to a standard write back policy but provides the advantage of reducing the latency when a coherent view of the stack at a lower level of memory is required.

Stack data within the system 10 may need to be written between the multiple levels of memory for several reasons. For example, data arrays 40 (illustrated in FIG. 2) may fill up such that cache lines may need to be written back to main memory 16 in order to free up space for new cache lines. Additionally, multi-processor systems may require a coherent view of the stack 32 in main memory 16 since the stack data might need to be read by a second processor (not shown in the figures). Since stack data may exist within the micro-stack 25 and the cache memory 14, maintaining a coherent stack 32 in main memory 16 may involve writing the contents of the micro-stack 25 and the modified cache lines of the cache memory 14 to main memory 16 using write back techniques such as specific cache commands to explicitly write back data from cache memory 14 to main memory 16. Write back techniques may involve dirty bits 39 that indicate the cache lines in cache memory 14 that have been modified but still need to be updated in main memory 16. For example, if word $W_0$ of cache line $CL_0$ is modified, then the dirty bit associated with cache line $CL_0$ may be enabled. In accordance with some embodiments, the number of dirty cache lines in cache memory 14 may be restricted for certain data types (e.g. stack data). For example, cache memory 14 preferably contains a single dirty cache line with stack data. Consequently, the number of cache lines that may need to be written back to main memory 16 from cache memory 14 in order to maintain a coherent stack 32 may be reduced and the latency associated with making the stack 32 coherent in the main memory 16 also may be reduced. With a reduced number of dirty cache lines, system 10 may utilize trend information to avoid unnecessarily writing dirty cache lines back to main memory 16.

Figure 4:
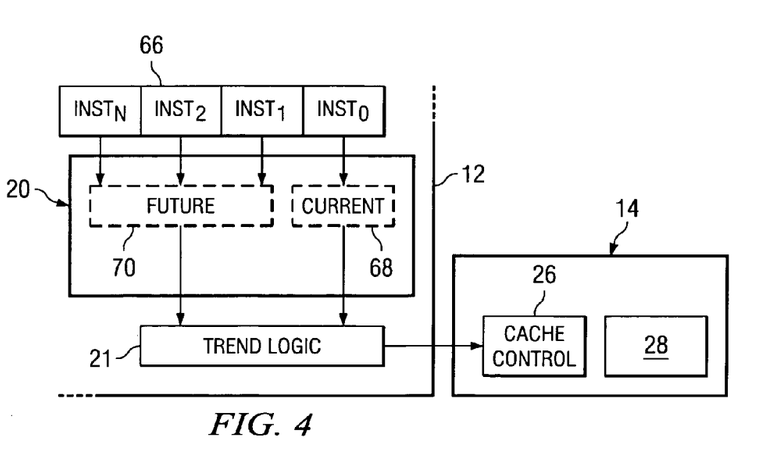
FIG. 4 illustrates exemplary decode logic.

Referring to FIG. 4, an instruction pipe 66 of processor 12 is illustrated including instructions INST.sub.0 through INST.sub.N. In a processor there may be several stages between the execution of a data memory access and the decode of an instruction. In addition, these stages might include some predecoding stages, such that the information supplied to the trend logic 21 might come from some decode and predecode logic. In the preferred embodiment, the memory access stage and the decode stage are separated by several pipe stages. Accordingly, the trend logic 21 may use one or more signals supplied by the decode logic 20. As instructions progress within the pipe their effect on the stack 32 is taken into account by the trend logic to generate the appropriate trend information to the cache controller. For example, trend logic 21 may receive CURRENT 68 and FUTURE 70 to generate the trend information about the stack 32. When the instruction preceding instruction INST.sub.0 is accessing memory, the trend logic 21 receives information from decode logic 20 and sends to the cache controller CURRENT 68 stack trend information relating to what effect instruction INST.sub.0 will have on the stack 32. In addition, the trend logic may send information indicating FUTURE 70 stack trend information corresponding to the following instruction INST.sub.1 through INST.sub.N. For example, if INST.sub.0 is an "iload" instruction (which pushes an operand on to the stack 32), then this may cause the stack 32 to increase by 1, whereas if INST.sub.0 is an "iadd" instruction (which pops two operands from the stack adds them together and pushes the result back on the stack), then this may cause the stack 32 to decrease by 1. In a similar fashion, FUTURE 70 represents a signal coming from the decoder 20 and potentially a predecode logic corresponding to a predetermined number of instructions following INST.sub.0 within the instruction pipe 66 (e.g., INST.sub.1 through INST.sub.N), and providing information on the evolution of the stack for the subsequent instructions to trend logic 21. Trend logic 21 may then utilize the CURRENT 68 and FUTURE 70 stack trend information to determine a net stack trend. For example, if INST.sub.1 increases the stack by 1, INST.sub.2 decreases the stack by 1, and INST.sub.3 decreases the stack by 2, then the net stack trend is to be decreased by 2. Using the net stack trend, the trend logic 21 may maintain more than one dirty cache line in cache memory 14 where the trend information may indicate that some of the data in the dirty cache lines are going to be consumed by the subsequent instructions.

Figure 5:
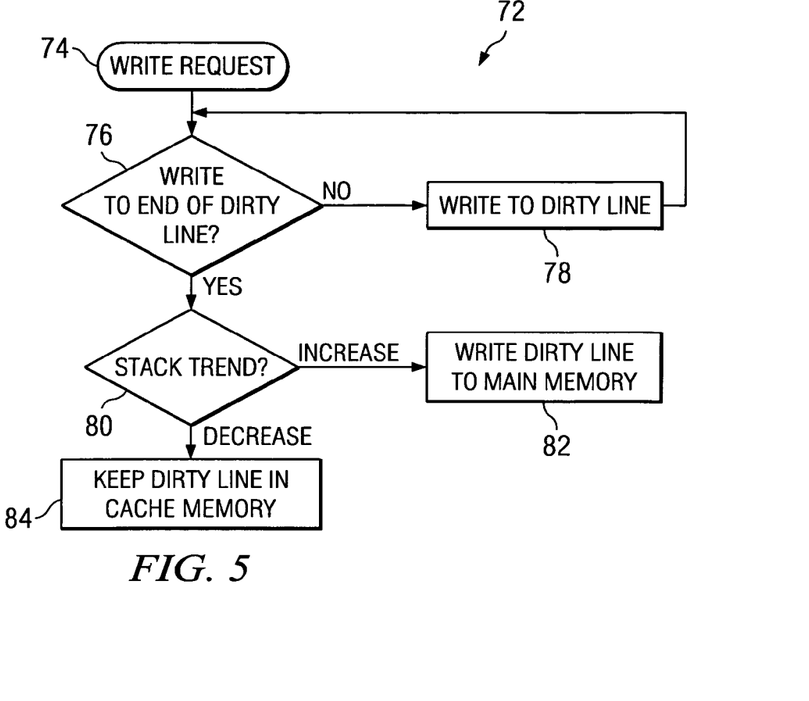
FIG. 5 illustrates an exemplary write back policy.
Figure 6:
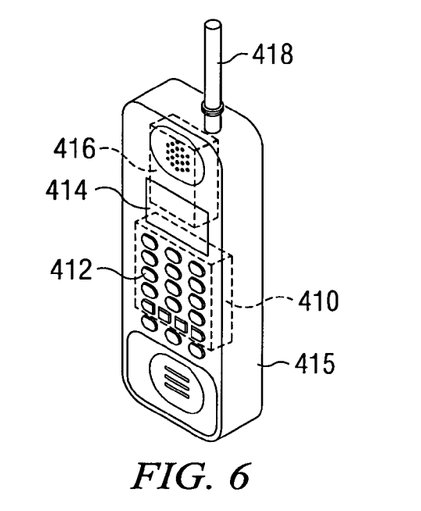
FIG. 6 illustrates an exemplary embodiment of the system described herein.

Referring to FIG. 5, a write back policy 72, which takes into account trend information, is illustrated that may be implemented by controller 26. Block 74 illustrates a write request coming from system 10 as a result of a micro-stack overflow. The micro-stack overflow itself results from the instruction currently executing a data write access within the stack. As a result of the write request, the AGU 22 may provide the write request 45 to the controller 26. Controller 26 then may determine whether the write request is going to write to the end of the single dirty cache line in cache memory 14, as indicated by block 76. If the write request is not directed to the end of the dirty cache line, then the write request will be performed. For example, if cache line $CL_0$ (illustrated in FIG. 2) represents the cache line in which stack data are currently written in the cache memory 14, and the stack pointer indicates that word $W_1$ is going to be written to, then the write request will be performed to cache line $CL_0$. Subsequent write requests also may write to cache line $CL_0$ until the end of the cache line is written to, i.e., stack pointer indicates that word $W_N$ is going to be written to. If the last word $W_N$ of a cache line holding stack data is going to be written to, then the overall stack trend may be evaluated as illustrated by block 80. If the overall stack trend is increasing, then subsequent write operations may require another cache line because all of the words in the current dirty cache line have been written to. Accordingly, to maintain a single dirty cache line within the cache memory 14, the dirty cache line may be written to main memory 16 if the stack trend is increasing as indicated by block 82. If the overall stack trend is decreasing, data within this line are going to be consumed next. Consequently, writing data from the dirty cache line to main memory is unnecessary. As illustrated in block 84, the cache line is kept in the cache memory 14 until the stack trend information indicates that the future instructions will cause the stack to increase beyond the last word in the dirty cache line.

Although the embodiments refer to situations where the stack 32 is increasing, i.e., the stack pointer incrementing as data are pushed onto the stack 32, the above discussion equally applies to situations where the stack 32 is decreasing, i.e., stack pointer decrementing as data are pushed onto the stack 32. Also, instead of checking of the last word of the cache line during the cache to adapt the cache policy, checking of the first word of the cache line may be performed. For example, if the stack pointer on a write access is referring to word $W_0$ of a cache line $CL_0$, and the trend information indicates that the stack is going to decrease on the following instructions, then the currently written line is kept dirty within the cache and write back to the main memory is avoided.

As was described above, stack based operations, such as pushing and popping data, may result in cache misses. The micro-stack 25 may initiate the data stack transfer between system 10 and the cache memory 14 that have been described above as write access on stack data. For example, in the event of an overflow or underflow operation, as is described in copending application entitled "A Processor with a Split Stack," filed Jul. 31, 2003, Ser. No. 10/632,079 and incorporated herein by reference, the micro-stack 25 may push and pop data from the stack 32.

As noted previously, system 10 may be implemented as a mobile cell phone such as that illustrated in FIG. 4. As shown, a mobile communication device includes an integrated keypad 412 and display 414. The processor 12 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, the various portions of the processor based system may exist on a single integrated circuit or as multiple integrated circuits. Also, the various memories disclosed may include other types of storage media such as disk array 17, which may comprise multiple hard drives. Accordingly, the scope of protection is not limited by the description set out above. Each and every claim is incorporated into the specification as an embodiment of the present invention.

What is claimed is:

1. A method, comprising:
  issuing a write request to a cache memory, wherein the cache memory includes multiple cache lines;
  determining whether the write request refers to a predetermined word within a dirty cache line; and
  determining whether to write the dirty cache line to main memory based on whether the size of a stack is increasing or decreasing.

2. The method of claim 1, further comprising determining whether the write request will be to the end of a dirty cache line.

3. The method of claim 2, wherein the stack size is increasing and the dirty cache line is written to a main memory.

4. The method of claim 2, wherein the stack size is decreasing and the dirty cache line is retained in the cache memory.

* * * * *